United States Patent [19]

Uchiyama

[11] Patent Number: 4,483,952
[45] Date of Patent: Nov. 20, 1984

[54] POLYOLEFIN RESIN COMPOSITION COMPRISING A DIBENZYLIDENE SORBITOL DERIVATIVE

[75] Inventor: Hiroshi Uchiyama, Hirakata, Japan

[73] Assignees: E.C. Chemical Ind. Co., Ltd.; Itoh & Co., Ltd., both of Osaka, Japan

[21] Appl. No.: 487,834

[22] Filed: Apr. 22, 1983

[30] Foreign Application Priority Data

Apr. 23, 1982 [JP] Japan ................... 57-67169

[51] Int. Cl.³ ............ C08L 23/06; C08L 23/12; C08K 5/15
[52] U.S. Cl. ................... 524/108; 524/377; 524/583; 524/585
[58] Field of Search ................ 524/108, 377

[56] References Cited

U.S. PATENT DOCUMENTS

| | | | |
|---|---|---|---|
| 4,016,118 | 4/1977 | Hamada et al. | 523/100 |
| 4,294,747 | 10/1981 | Su | 524/108 |
| 4,314,039 | 2/1982 | Kawai et al. | 524/108 |
| 4,371,645 | 2/1983 | Mahaffey | 524/108 |
| 4,388,119 | 6/1983 | Uchiyama | 524/108 |

FOREIGN PATENT DOCUMENTS

| | | |
|---|---|---|
| 0068773 | 1/1983 | European Pat. Off. . |
| 0058547 | 5/1978 | Japan . |
| 0117044 | 10/1978 | Japan . |
| 2077255 | 12/1981 | United Kingdom . |

OTHER PUBLICATIONS

Derwent Abst. 27227 E/14 (2-1982), Mitsui Toatsu, (J57034924).
Derwent Abst. 02724 E/02 (11-1981), Mitsubishi, (J56149451).
Derwent Abst. 63816 Y/36 (7-1977), New Japan, (J52089158).
Derwent Abst. 58537 E/28 (Jun. 1982), New Japan, (J57092038).

*Primary Examiner*—Herbert J. Lilling
*Attorney, Agent, or Firm*—Wenderoth, Lind & Ponack

[57] ABSTRACT

A polyolefin resin composition consisting essentially of at least one homopolymer or copolymer of an aliphatic monoolefin and 0.05 to 2% by weight, based on the weight of the composition, of a dibenzylidene sorbitol derivative of the following formula

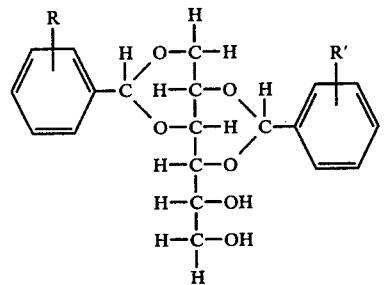

wherein R and R' are different from each other and each represents a member selected from the class consisting of a hydrogen atom, a chlorine atom, alkyl groups having 1 to 3 carbon atoms and alkoxy groups having a $C_1$–$C_3$ alkyl moiety.

12 Claims, No Drawings

POLYOLEFIN RESIN COMPOSITION COMPRISING A DIBENZYLIDENE SORBITOL DERIVATIVE

This invention relates to a polyolefin resin composition having improved transparency, low molding shrinkage and reduced tendency to static buildup.

Polyolefins such as polyethylene or polypropylene have found extensive use as packaging materials and containers in the form of films, sheets or hollow articles. Since, however, the polyolefins have poor transparency, they cannot fully meet the consumer's demand for packaging materials or containers which permit their contents to be viewed from outside.

Many proposals have been made in the past to improve the transparency of polyolefins. For example, attempts have been made to use p-t-butylbenzoic acid, low-molecular-weight polyethylene and low-molecular-weight polypropylene as additives. But with these additives, the transparency of the polyolefins cannot be improved sufficiently, or the properties of molded polyolefin articles are deteriorated. Hence, no satisfactory results have so far been obtained in the art.

The present inventor previously proposed the use of dibenzylidene sorbitol as an additive (Japanese Patent Application No. 94424/1974). It was found however that the compatibility of this additive with polyolefin resins is not entirely sufficient. Further investigations led to the discovery that the addition of a small amount of tribenzylidene sorbitol to dibenzylidene sorbitol gives an additive having greatly improved compatibility with polyolefin resins (Japanese Laid-Open Patent Publication No. 160041/1980). It was later found that although the additive composed of dibenzylidene sorbitol and a small amount of tribenzylidene sorbitol has good compatibility with polyolefin resins and greatly improves transparency and reduces molding shrinkage, it slightly tends to bleed out onto the surface of the resulting molded article, and furthermore, the surface of the molded article tends to collect static charges and therefore to be contaminated.

It is an object of this invention to provide an additive for polyolefin resins, which improves the transparency of a molded article of a polyolefin and reduces its molding shrinkage without bleed out or static charge buildup on the surface of the molded article.

According to this invention, there is provided a polyolefin resin composition consisting essentially of at least one homopolymer or copolymer of an aliphatic monoolefin and 0.05 to 2% by weight, based on the weight of the composition, of a dibenzylidene sorbitol derivative of the following formula

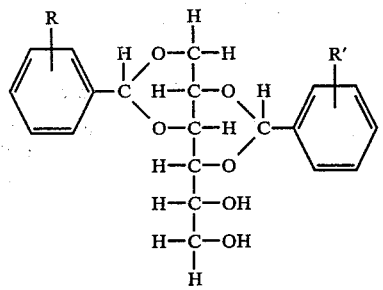

wherein R and R' are different from each other and each represents a member selected from the class consisting of a hydrogen atom, a chlorine atom, alkyl groups having 1 to 3 carbon atoms and alkoxy groups having a $C_1$–$C_3$ alkyl moiety, preferably a hydrogen atom or an alkyl group having 1 to 3 carbon atoms.

The polyolefin resin whose transparency is improved and whose molding shrinkage and tendency to static buildup are reduced by the present invention denotes a homopolymer or copolymer of an aliphatic monoolefin with 2 to 6 carbon atoms having a number average molecular weight of about 10,000 to 200,000, preferably about 30,000 to 150,000. Examples are a propylene homopolymer, a copolymer of propylene with a relatively small proportion of ethylene as a comonomer, linear polyethylene, low-density polyethylene, medium-density polyethylene, high-density polyethylene, polymethylpentene and mixtures of at least two of these. Preferred polyolefin resins are the propylene homopolymer, propylene/ethylene copolymer, linear polyethylene and low-density polyethylene. Polypropylene-type polymers having at least 50% by weight of propylene units are especially preferred.

Examples of the $C_1$–$C_3$ alkyl groups represented by the substituents R and R' in the dibenzylidenesorbitol derivative of the above formula used in this invention are methyl, isopropyl and ethyl groups. Methyl and ethyl are preferred. Examples of the alkoxy group having a $C_1$–$C_3$ alkyl moiety are methoxy and ethoxy groups.

The substituting position of each of R and R' may be para, ortho or meta to the group

but preferably it is at the para-position.

Examples of the dibenzylidene sorbitol derivative of the above formula include:
1,3-p-methylbenzylidene-2,4-p-chlorobenzylidene sorbitol,
1,3-p-benzylidene-2,4-p-chlorobenzylidene sorbitol,
1,3-p-methylbenzylidene-2,4-p-isopropylbenzylidene sorbitol,
1,3-benzylidene-2,4-p-isopropylbenzylidene sorbitol,
1,3-p-methylbenzylidene-2,4-p-ethylbenzylidene sorbitol,
1,3-benzylidene-2,4-p-ethylbenzylidene sorbitol, and
1,3-benzylidene-2,4-p-methylbenzylidene sorbitol.
Preferred dibenzylidene sorbitol derivatives are 1,3-p-ethylbenzylidene-2,4-p-methylbenzylidene sorbitol, 1,3-p-methylbenzylidene-2,4-p-ethylbenzylidene sorbitol, 1,3-benzylidene-2,4-p-methylbenzylidene sorbitol, 1,3-p-methylbenzylidene-2,4-benzylidene sorbitol, 1,3-benzylidene-2,4-p-ethylbenzylidene sorbitol, and 1,3-p-ethylbenzylidene-2,4-benzylidene sorbitol.

Since the dibenzylidene sorbitol derivative used in this invention has very good compatibility with polyolefin resins, it is not necessary to add a higher fatty acid or a carboxylic acid anhydride to improve compatibility as in the case of the known dibenzylidene sorbitols.

The amount of the dibenzylidene sorbitol derivative to be incorporated in the polyolefin resin composition of this invention is 0.005 to 2% by weight, preferably 0.05 to 1% by weight, especially preferably 0.1 to 0.7% by weight, based on the weight of the composition. If it is less than 0.005% by weight, the effect of improving transparency is insufficient. Amounts exceeding 2% by weight produce no additional advantage, but rather cause opacification.

The dibenzylidene sorbitol derivative used in this invention can be obtained in a good yield by reacting 1 mole of D-sorbitol with about 1 mole of a compound of the formula

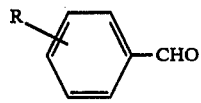

in which R is as defined above in the presence of an acid catalyst at a temperature of 10° to 40° C. until the conversion of the starting materials to a monobenzylidene sorbitol is in the range of 40 to 70%, thereafter adding water and a compound of formula

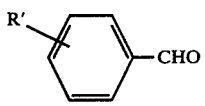

wherein R' is as defined above, and reacting the mixture at room temperature in suspension. The benzylidene derivative obtained in this manner can be used in the polyolefin resin composition of this invention without particularly purifying it.

The composition of this invention can be obtained by adding predetermined amount of the dibenzylidene sorbitol derivative to the polyolefin resin and simply mixing them by any desired mixing means.

The composition of this invention may also include other additives, for example, coloring agents, plasticizers such as dioctyl phthalate, dibutyl phthalate, dioctyl stearate and dioctyl adipate, and fillers such as calcium stearate so long as these additives do not adversely affect the improved transparency, low-molding shrinkage and reduced tendency to static buildup of the composition of this invention.

Since the composition of this invention has improved transparency, low molding shrinkage and reduced tendency to static buildup and gives films, sheets and hollow articles having excellent mechanical and chemical properties, it is very useful as packaging materials for cosmetics, foodstuffs, etc., and as containers.

The following examples illustrate the present invention more specifically. All parts and percentages shown in the examples are by weight unless otherwise specified.

The transparency (Haze value) and the dimensional stability value shown in the examples were measured by the following methods.

(1) Haze value Measured in accordance with ASTM D1001-59T.

(2) Dimensional stability

It is shown by shrinkage. The polyolefin resin composition was injection-molded at a predetermined injection temperature using a rectangular mold having a sectional size of 10 mm × 10 mm. The shrinkage of the molded article is calculated from the following equation.

$$Shrinkage\ (\%) = \frac{\left(\begin{array}{c}\text{Depth of}\\\text{the mold}\end{array}\right) - \left(\begin{array}{c}\text{Thickness of}\\\text{the sample}\end{array}\right)}{\text{Depth of the mold}} \times 100$$

(3) Test for tendency to static buildup.

This is defined by the charge decay time. A charge from a high voltage power supply was applied to the surface of a test sample, and the time in seconds which elapsed until the applied charge decayed to half of its original value was measured.

REFERENTIAL EXAMPLE 1

A reactor was charged with 120 g (1 mole) of p-methylbenzaldehyde, 270 g (1 mole) of a 70% aqueous solution of D-sorbitol and 10 g of p-toluenesulfonic acid, and they were reacted at 35° C. with stirring. Shortly, a large amount of fine white crystals precipitated in the mixture within the reactor, and became creamy in 45 minutes. The torque of the stirrer became about three times as high as that at the start of the reaction. At this time, the amount of mono-p-methylbenzylidene sorbitol formed was 43% of theory.

To the white creamy reaction product obtained by the aforesaid first-step reaction was added 134 g (1 mole) of p-ethylbenzaldehyde, and 400 g of a 10% aqueous solution of hydrochloric acid was additionally fed as a catalyst to initiate a second-step reaction.

The temperature was lowered to 25° C., and at this temperature, the mixture was stirred for 6 hours to give a white suspension. The white suspension was treated with a 10% aqueous solution of sodium hydroxide to neutralize the catalyst. It was then filtered by a centrifugal separator, washed with water and dried to give 223 g of 1,3-p-methylbenzylidene-2,4-p-ethylbenzylidene sorbitol having a purity of 97%. This amount was about 56% of theory. The final product had a melting point of 200° to 204° C.

REFERENTIAL EXAMPLE 2

A reactor was charged with 106 g (1 mole) of benzaldehyde, 270 g (1 mole) of a 70% aqueous solution of D-sorbitol and 20 g of 50% sulfuric acid, and they were reacted at 15° C. with stirring. Thirty minutes after the formation of fine crystals in the mixture within the reactor, the torque of the stirrer became about 3 times as high as that at the start of the reaction. At this time, the amount of monobenzylidene sorbitol formed was 42% of theory.

To the white creamy reaction product obtained by the first-step reaction, 120 g (1 mole) of p-methylbenzaldehyde was added, and 400 g of a 10% aqueous solution of hydrochloric acid was fed as an additional catalyst to initiate a second-step reaction. The second-step reaction was carried out in the same way as in Referential Example 1 to give 258 g (about 70% of theory) of 1,3-benzylidene-2,4-p-methylbenzylidene sorbitol having a purity of 95% and a melting point of 190° to 193° C.

REFERENTIAL EXAMPLE 3

A reactor was charged with 106 g (1 mole) of benzaldehyde, 270 g (1 mole) of a 70% aqueous solution of D-sorbitol and 15 g of hexahydrophthalic anhydride, and they were reacted at 20° C. with stirring. In 45 minutes after the formation of fine crystals in the mixture within the reactor, the torque of the stirrer became about 3 times as high as that at the start of the reaction. At this time, the amount of monobenzylidene sorbitol formed was 40% of theory.

To the white creamy reaction product obtained by the first-step reaction was added 134 g (1 mole) of p-ethylbenzaldehyde, and 400 g of a 10% aqueous solution of hydrochloric acid was fed as an additional catalyst to initiate a second-step reaction. The second-step reaction was carried out in the same way as in Referential Example 1 to give 302 g (about 72% of theory) of 1,3-benzylidene-2,4-p-ethylbenzylidene sorbitol having a purity of 96% and a melting point of 192° to 195° C.

EXAMPLE 1

Pellets of an ethylene propylene copolymer (Showaromer MG410, a product of Showa Denko K.K.) having an average molecular weight of 40,000 and a propylene unit content of 90 mole %) were mixed with 1,3-p-methylbenzylidene-2,4-p-ethylbenzylidene sorbitol obtained in Referential Example 1, dibenzylidene sorbitol (control), or a mixture of 20% of tribenzylidene sorbitol and 80% of dibenzylidene sorbitol (control) in the amounts indicated in Table 1 by a blender. The resulting resin composition was injection-molded at a temperature of 280° C. to prepare test samples.

The proportions of the components of the resin composition and the properties of the test samples are shown in Table 1.

EXAMPLE 2

Pellets of low-density polyethylene (Showlex XM173-1, a product of Showa Denko K.K.) having a density of about 0.92 and an average molecular weight of about 24,000 were mixed with 1,3-benzylidene-2,4-p-methylbenzylidene sorbitol obtained in Referential Example 2, dibenzylidene sorbitol (control), or a mixture of 20% of tribenzylidene sorbitol and 80% of dibenzylidene sorbitol (control) in the amounts indicated in Table 2 by a blender. The resulting resin composition was injection-molded at a temperature of 230° C. to prepare test samples.

The results are shown in Table 2.

TABLE 2

| | Proportions (parts) | | | | Properties | | |
|---|---|---|---|---|---|---|---|
| Composition No. | Polyethylene | 1,3-benzylidene-2,4-p-methylbenzylidene sorbitol | Dibenzylidene sorbitol | Mixture of 20% of tribenzylidene sorbitol and 80% of dibenzylidene sorbitol | Haze (%) | Shrinkage (%) | Charge decay time (seconds) |
| 2-1 (control) | 100 | 0 | 0 | 0 | 77 | 14.2 | 650 |
| 2-2 | 99.9 | 0.1 | 0 | 0 | 65 | 10.8 | 630 |
| 2-3 | 99.8 | 0.2 | 0 | 0 | 50 | 8.0 | 620 |
| 2-4 | 99.7 | 0.3 | 0 | 0 | 35 | 7.5 | 620 |
| 2-5 (control) | 99.7 | 0 | 0.3 | 0 | 39 | 7.5 | 850 |
| 2-6 (control) | 99.7 | 0 | 0 | 0.3 | 36 | 7.5 | 800 |

EXAMPLE 3

Pellets of an ethylene propylene copolymer (Mitsubishi Noblene BC-8, a product of Mitsubishi Petrochemical Co., Ltd.) having an average molecular weight of 40,000 and a propylene unit content of 90 mole% were mixed with 1,3-benzylidene-2,4-p-ethylbenzylidene sorbitol obtained in Referential Example 3, dibenzylidene sorbitol (control), or a mixture of 20% of tribenzylidene sorbitol and 80% of dibenzylidene sorbitol (control) by a blender. The resulting resin composition was injection-molded at 260° C. to prepare test samples.

The proportions of the components of the resin composition and the properties of the test samples are shown in Table 3.

TABLE 1

| | Proportions (parts) | | | | Properties | | |
|---|---|---|---|---|---|---|---|
| Composition No. | Ethylene/propylene copolymer | 1,3-p-Methylbenzylidene-2,4-p-ethylbenzylidene sorbitol | Dibenzylidene sorbitol | Mixture of 20% of tribenzylidene sorbitol and 80% of dibenzylidene sorbitol | Haze (%) | Shrinkage (%) | Charge decay time (seconds) |
| 1-1 (control) | 100 | 0 | 0 | 0 | 75 | 16.5 | 600 |
| 1-2 | 99.9 | 0.1 | 0 | 0 | 39 | 15.1 | 580 |
| 1-3 | 99.8 | 0.2 | 0 | 0 | 30 | 13.8 | 570 |
| 1-4 | 99.7 | 0.3 | 0 | 0 | 22 | 7.0 | 550 |
| 1-5 (control) | 99.7 | 0 | 0.3 | 0 | 35 | 6.8 | 750 |
| 1-6 (control) | 99.7 | 0 | 0 | 0.3 | 34 | 6.9 | 720 |

TABLE 3

| Composition No. | Ethylene propylene copolymer | 1,3-Benzylidene-2,4-p-ethylbenzylidene sorbitol | Dibenzylidene sorbitol | Mixture of 20% of tribenzylidene sorbitol and 80% of dibenzylidene sorbitol | Haze (%) | Shrinkage (%) | Charge decay time (seconds) |
|---|---|---|---|---|---|---|---|
| 3-1 (control) | 100 | 0 | 0 | 0 | 80 | 14.0 | 700 |
| 3-2 | 99.9 | 0.1 | 0 | 0 | 52 | 12.5 | 700 |
| 3-3 | 99.8 | 0.2 | 0 | 0 | 42 | 10.2 | 680 |
| 3-4 | 99.7 | 0.3 | 0 | 0 | 30 | 7.0 | 670 |
| 3-5 (control) | 99.7 | 0 | 0.3 | 0 | 34 | 7.2 | 800 |
| 3-6 (control) | 99.7 | 0 | 0 | 0.3 | 34 | 7.8 | 800 |

EXAMPLE 4

Pellets of crystalline polypropylene resin (Showaromer MA410, a product of Showa Denko K.K.) having an average molecular weight of 50,000 were mixed with 1,3-p-methylbenzylidene-2,4-p-ethylbenzylidene sorbitol obtained in Referential Example 1, dibenzylidene sorbitol (control), or a mixture of 20% tribenzylidene sorbitol and 80% of dibenzylidene sorbitol (control) in the amounts indicated in Table 4. The resulting resin composition was injection molded at 280° C. to prepare test samples.

The proportions of the components of the resin composition and the properties of the test samples are shown in Table 4.

EXAMPLE 5

Pellets of low-density linear polyethylene (ULTZEX 3010F, a product of Mitsui Petrochemical Industries, Ltd.) having a density of about 0.93 were mixed with 1,3-p-methylbenzylidene-2,4-p-ethylbenzylidene sorbitol obtained in Referential Example 1, dibenzylidene sorbitol (control), or a mixture of 20 parts of tribenzylidene sorbitol and 80% of dibenzylidene sorbitol (control) in the amounts indicated in Table 5 by a blender. The resin composition was pressed to form a sheet having a thickness of 0.1 mm.

The proportions of the components of the resin composition and the transparency and charge characteristics of the sheet are shown in Table 5.

TABLE 4

| Composition No. | Polypropylene resin | 1,3-p-Methylbenzylidene-2,4-p-ethylbenzylidene sorbitol | Dibenzylidene sorbitol | Mixture of 20% of tribenzylidene sorbitol and 80% of dibenzylidene sorbitol | Haze (%) | Shrinkage (%) | Charge decay time (second) |
|---|---|---|---|---|---|---|---|
| 4-1 (control) | 100 | 0 | 0 | 0 | 87 | 16 | 685 |
| 4-2 | 99.9 | 0.1 | 0 | 0 | 70 | 13.8 | 685 |
| 4-3 | 99.8 | 0.2 | 0 | 0 | 53 | 12.0 | 670 |
| 4-4 | 99.7 | 0.3 | 0 | 0 | 40 | 9.3 | 670 |
| 4-5 (control) | 99.7 | 0 | 0.3 | 0 | 48 | 9.3 | 720 |
| 4-6 (control) | 99.7 | 0 | 0 | 0.3 | 47 | 9.5 | 720 |

TABLE 5

| Composition No. | Low-density linear polyethylene | 1,3-p-Methylbenzylidene-2,4-p-ethylbenzylidene sorbitol | Dibenzylidene sorbitol | Mixture of 20% of tribenzylidene sorbitol and 80% of dibenzylidene sorbitol | Haze (%) | Charge decay time (seconds) |
|---|---|---|---|---|---|---|
| 5-1 (control) | 100 | 0 | 0 | 0 | 68 | 520 |
| 5-2 | 99.9 | 0.1 | 0 | 0 | 50 | 520 |
| 5-3 | 99.8 | 0.2 | 0 | 0 | 41 | 510 |
| 5-4 | 99.7 | 0.3 | 0 | 0 | 36 | 500 |
| 5-5 (control) | 99.7 | 0 | 0.3 | 0 | 38 | 580 |
| 5-6 (control) | 99.7 | 0 | 0 | 0.3 | 36 | 580 |

What is claimed is:

1. A polyolefin resin composition consisting essentially of at least one homopolymer or copolymer of an aliphatic monoolefin and 0.05 to 2% by weight, based on the weight of the composition, of a dibenzylidene sorbitol derivative of the following formula

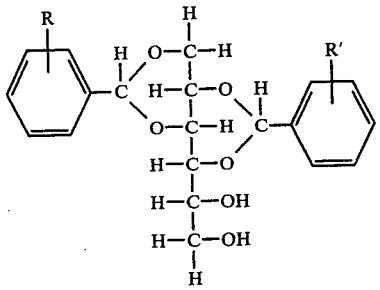

wherein R and R' are different from each other and each represents a member selected from the class consisting of a hydrogen atom, alkyl groups having 1 to 3 carbon atoms and alkoxy groups having a $C_1$-$C_3$ alkyl moiety.

2. The composition of claim 1 wherein the aliphatic monoolefin is selected from the group consisting of ethylene, propylene and methylpentene.

3. The composition of claim 1 wherein the dibenzylidene sorbitol derivative is 1,3-p-methylbenzylidene-2,4-p-ethylbenzylidene sorbitol.

4. The composition of claim 1 wherein the dibenzylidene sorbitol derivative is 1,3-p-ethylbenzylidene-2,4-p-methylbenzylidene sorbitol.

5. The composition of claim 1 wherein the dibenzylidene sorbitol derivative is 1,3-benzylidene-2,4-p-methylbenzylidene sorbitol.

6. The composition of claim 1 wherein the dibenzylidene sorbitol is 1,3-p-methylbenzylidene-2,4-benzylidene sorbitol.

7. The composition of claim 1 wherein the dibenzylidene sorbitol derivative is 1,3-benzylidene-2,4-p-ethylbenzylidene sorbitol.

8. The composition of claim 1 wherein the dibenzylidene sorbitol derivative is 1,3-p-ethyl-2,4-benzylidene sorbitol.

9. A polyolefin resin composition consisting essentially of at least one homopolymer or copolymer of an aliphatic monoolefin and 0.05 to 2% by weight, based on the weight of the composition, of a dibenzylidene sorbitol derivative of the following formula:

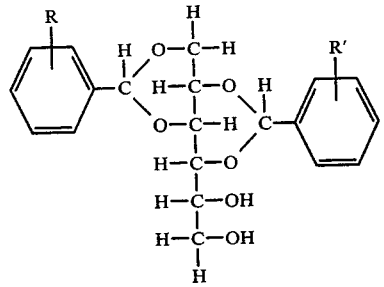

wherein R and R' are different from each other and each represents a member selected from the class consisting of a hydrogen atom and an alkyl group having 1 to 3 carbon atoms.

10. A polyolefin resin composition consisting essentially of at least one homopolymer or copolymer of an aliphatic monoolefin and 0.05 to 2% by weight, based on the weight of the composition, of 1,3-p-chloro-benzylidene-2,4-p-methylbenzylidene sorbitol or 1,3-p-methylbenzylidene-2,4-p-chlorobenzylidene sorbitol.

11. The composition according to claim 10 wherein the dibenzylidene sorbitol derivative is 1,3-p-methylbenzylidene-2,4-p-chlorobenzylidene sorbitol.

12. The composition of claim 10 wherein the dibenzylidene sorbitol derivative is 1,3-p-chlorobenzylidene-2,4-p-methylbenzylidene sorbitol.

* * * * *

UNITED STATES PATENT AND TRADEMARK OFFICE
CERTIFICATE OF CORRECTION

PATENT NO. : 4,483,952

DATED : Nov. 20, 1984

INVENTOR(S) : Hiroshi Uchiyama

It is certified that error appears in the above-identified patent and that said Letters Patent is hereby corrected as shown below:

First page, column 1, next to "[73] Assignees:" change "Itoh & Co., Ltd." to --C. Itoh & Co., Ltd.--.

Signed and Sealed this

Eighteenth Day of June 1985

[SEAL]

Attest:

DONALD J. QUIGG

Attesting Officer     Acting Commissioner of Patents and Trademarks